(12) United States Patent
Abe et al.

(10) Patent No.: US 8,637,785 B2
(45) Date of Patent: Jan. 28, 2014

(54) WIRE-CUT ELECTRIC DISCHARGE MACHINE HAVING WORKPIECE MEASURING MECHANISM

(75) Inventors: Hiroyuki Abe, Yamanashi (JP); Koji Suzuki, Yamanashi (JP); Yushi Takayama, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 147 days.

(21) Appl. No.: 13/112,319

(22) Filed: May 20, 2011

(65) Prior Publication Data

US 2012/0031879 A1 Feb. 9, 2012

(30) Foreign Application Priority Data

Aug. 6, 2010 (JP) .................................. 2010-177389

(51) Int. Cl.
*B23H 7/06* (2006.01)
(52) U.S. Cl.
USPC ....................................................... 219/69.12
(58) Field of Classification Search
USPC .............................. 219/69.12, 69.17; 700/162
See application file for complete search history.

(56) References Cited

U.S. PATENT DOCUMENTS

| 4,324,970 A | 4/1982 | Nanasawa et al. | |
| 4,970,362 A * | 11/1990 | Ono | 219/69.12 |
| 5,138,126 A * | 8/1992 | Naka et al. | 219/69.12 |
| 7,054,712 B2 * | 5/2006 | Murai et al. | 700/162 |
| 2006/0253846 A1 * | 11/2006 | Ogata et al. | 717/151 |

FOREIGN PATENT DOCUMENTS

| EP | 0038658 | 10/1981 |
| JP | 61-257717 A * | 11/1986 |
| JP | 63267121 A | 11/1988 |
| JP | 06-190685 A | 7/1994 |
| JP | 7-136855 A | 5/1995 |
| JP | 2002307242 A | 10/2002 |
| JP | 2004268220 A | 9/2004 |
| JP | 2008044033 A | 2/2008 |

OTHER PUBLICATIONS

Notice of Reasons for Refusal for Japanese Patent Application No. 2010-177389, dispatched on Sep. 27, 2011.
European Search Report for Application No. 11166568.3 dated Nov. 30, 2011.
A Japanese Decision to Grant, dated Jun. 26, 2012, in JP Application No. 2010-177389.

* cited by examiner

*Primary Examiner* — Geoffrey S Evans
(74) *Attorney, Agent, or Firm* — Lowe Hauptman & Ham LLP (57) ABSTRACT

A machining program used for machining a workpiece with a wire-cut electric discharge machine is used for measuring a shape of the workpiece. A wire electrode moved in a direction away from the workpiece by an offset command for machining is moved close to the workplace in workplace measurement after the machining. In other words, the wire electrode is moved in an opposite direction to an offset direction for the machining. Then, an end face position of the machined workpiece detected by a position of the wire electrode when the wire electrode comes in contact with the workpiece.

12 Claims, 8 Drawing Sheets

```
G0001
N01M101
N02M98P0002
N03M102
N04M98P0002
N05M103
N06IF[#100EQ1]GOTO01
N07M30
```

MEASUREMENT EXAMPLE 1
(BLOCK MIDPOINT)

FIG.9

MEASUREMENT EXAMPLE 2
(DESIGNATED DISTANCE)

WIRE-CUT ELECTRIC DISCHARGE MACHINE HAVING WORKPIECE MEASURING MECHANISM

RELATED APPLICATIONS

The present application is based on, and claims priority from, Japanese Application Number 2010-177389, filed Aug. 6, 2010, the disclosure of which is hereby incorporated by reference herein in its entirety.

BACKGROUND OF THE INVENTION

1. Field of the Invention

The invention relates to a wire-cut electric discharge machine and particularly to a wire-cut electric discharge machine having a workpiece measuring function of measuring, by using a machining program, a shape of a workpiece machined by the machining program.

2. Description of the Related Art

Machining accuracy of a workplace machined by a wire-cut electric discharge machine may be checked by 1) measuring the workplace by a micrometer, 2) detaching the workpiece from the machine and attaching it to a measuring device disposed apart to measure it, or 3) preparing a measuring program corresponding to a machining program to measure the workpiece, after machining of the workpiece.

As techniques related to the above 2) and 3), there is a technique of a self-correcting machining method for bringing a touch probe into contact with a machined workplace from an optimum direction and carrying out correcting machining of the machined workplace based on obtained measurement values as disclosed in Japanese Patent Application. Laid-Open No. 6-190685.

In both of the above cases of 1) and 2), a worker needs to be there between the end of the machining and the measurement. Especially, the case of 2) requires preparation of detachment and attachment of the workpiece and takes many man-hours. To automate checking of the workpiece machining accuracy, it is necessary to dispose a workpiece moving means such as a robot, which scales up a system configuration. Although the checking can be automated and made unattended in the case of 3), it is necessary to create a measurement program every time the machining program is updated, which is much trouble.

SUMMARY OF THE INVENTION

Therefore, with the above problems of the related art in view, it is an object of the invention to provide a wire-cut electric discharge machine having a function of measuring, by using a machining program, a shape of a workpiece machined by the machining program.

A wire-cut electric discharge machine according to the invention includes: analysis means for analyzing a block of a machining program; means for carrying out on/off control of application of machining power supply voltage to a wire electrode; calculating means for calculating a measuring point and a measuring direction by using an analysis result of the block of the workpiece machining program by the analysis means; storage means for storing the measuring point and the measuring direction calculated by the calculating means; means for relatively moving the wire electrode with respect to the workpiece in a state in which, the application of the machining power supply voltage to the wire electrode is turned off in accordance with the block of the machining program analyzed by the analysis means; determining means for determining whether or not the wire electrode has moved with respect to the workpiece and reached the measuring point; means for relatively moving the wire electrode with respect to the workpiece in the measuring direction stored in the storage means, in a case where it is determined by the determining means that the wire electrode has reached the measuring point; contact detecting means for detecting that the wire electrode has come in contact with the workpiece; and position detecting means for detecting a position of the wire electrode when the contact detecting means detects contact between the wire electrode and the workpiece.

The measuring point may be a midpoint between a starting point and an end point of the block in the machining program, an equally dividing point, or a position a predetermined distance away from the starting point of the block.

The measuring direction can be obtained from a relative moving direction of the wire electrode with respect to the workpiece and an offset command described in the block in the machining program.

Faint voltage is applied to the wire electrode by a voltage applying device and the contact detecting means may detect the contact by utilizing a fact that the wire electrode becomes equal to the workpiece in potential when the wire electrode comes in contact with a machined end face of the workpiece.

The wire-cut electric discharge machine may further comprise a measuring probe which comes in contact with the workpiece to detect the contact with the workpiece, in a position having a predetermined positional relationship to the wire electrode. In this case, the position detecting means detects position of the measuring probe when the measuring probe comes in contact with the workpiece instead of detecting the position of the wire electrode when the wire electrode comes in contact with the workpiece.

Because the invention has the above structure, it is possible to provide the wire-cut electric discharge machine having the function of measuring, by using the machining program, the shape of the workpiece machined by the machining program.

BRIEF DESCRIPTION OF THE DRAWINGS

The above and other objects and features of the invention will become apparent from the following description of embodiments with reference to the accompanying drawings, wherein.

DETAILED DESCRIPTION OF THE PREFERRED EMBODIMENTS

A wire-cut electric discharge machine having a workpiece measuring function of the invention measures end faces of a workpiece 2 by using a wire electrode 1. By utilizing a fact that the wire electrode 1 becomes equal to the workpiece 2 in potential when the wire electrode 1 comes in contact with a machined end face of the workpiece 2, a position of the wire electrode 1 at the time of contact is received from a numerical controller 50 to thereby obtain position information of the end face of the workpiece 2.

Figure 1:
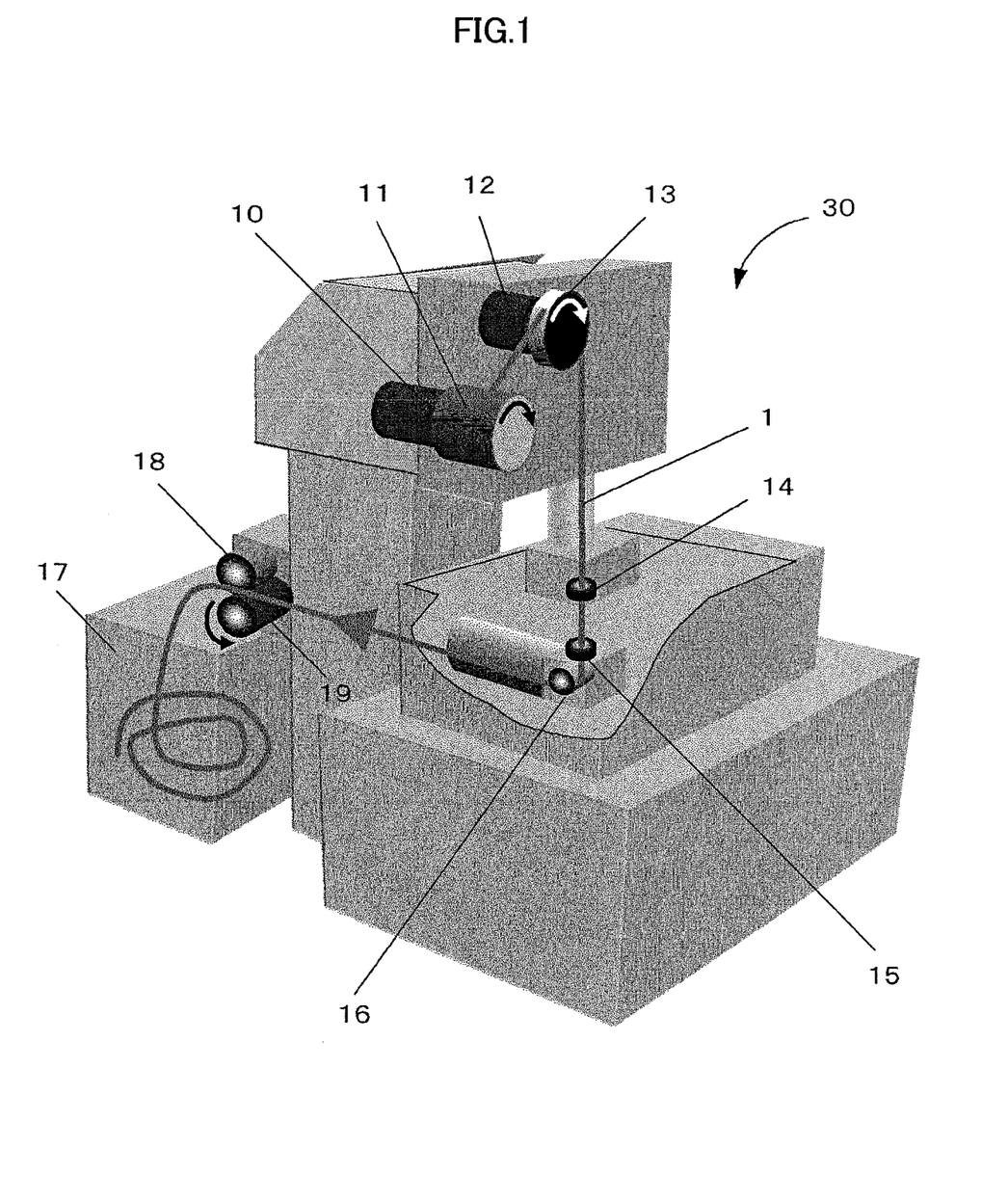
FIG. 1 is a schematic block diagram of an embodiment of a wire-cut electric discharge machine main body according to the invention.

FIG. 1 is a schematic block diagram of on embodiment of a wire-cut electric discharge machine main body 30 according to the invention.

To a wire bobbin 11 around which the wire electrode 1 is wound, predetermined low torque commanded in a reverse direction to an unreeling direction of the wire electrode 1 is given by a feed section torque motor 10. The wire electrode 1 unreeled from the wire bobbin 11 passes a plurality of guide rollers (not shown) and tension of the wire electrode 1 is adjusted between a brake shoe 13 and a feed roller 19 by the brake shoe 13. The brake shoe 13 is driven by the brake motor 12 and the feed roller 19 is driven by a wire electrode feeding motor (not shown).

The wire electrode 1 that has passed the brake shoe 13 passes through an upper wire guide 14, a lower wire guide 15, and a lower guide roller 16, runs while pinched between a pinch roller 18 and the feed roller 19, and is collected into a wire electrode collection box 17.

Figure 2:
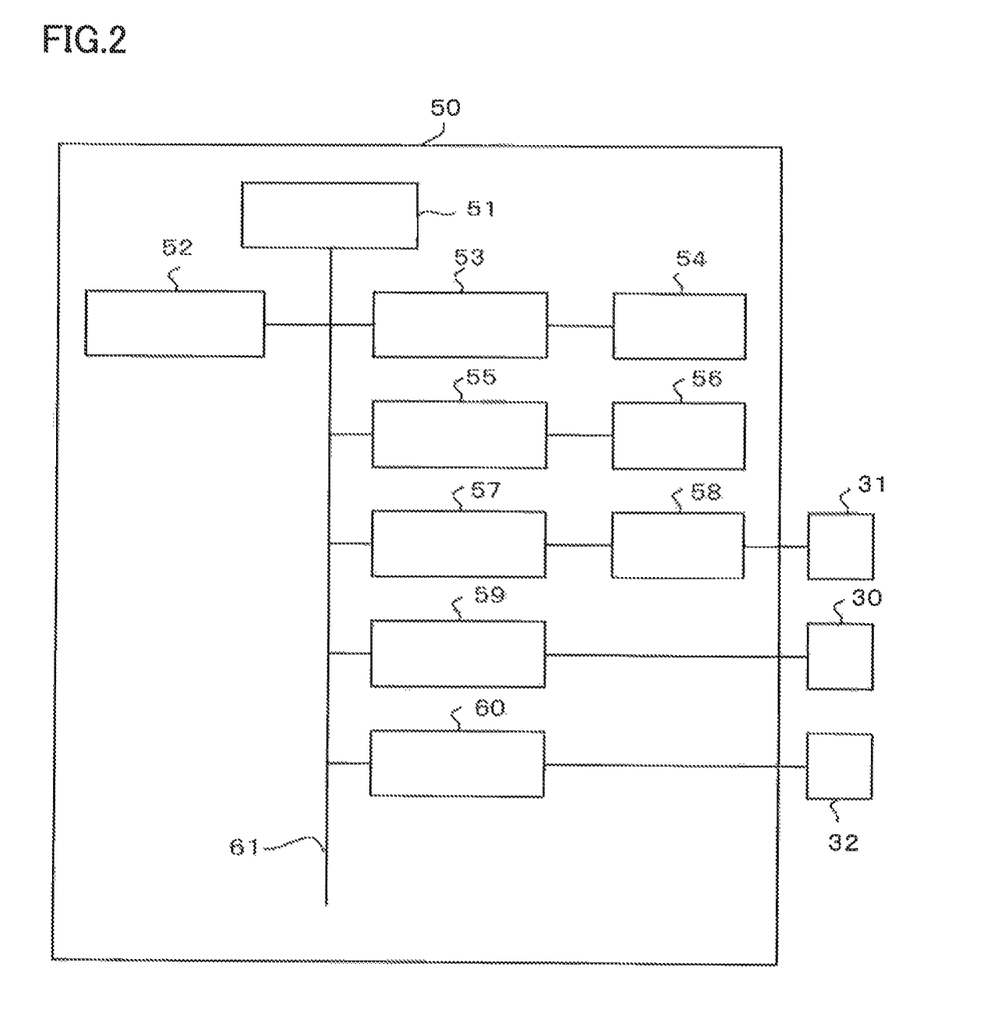
FIG. 2 is a schematic block diagram of a numerical controller (CNC) for controlling the wire-cut electric discharge machine main body shown in FIG. 1.

Next, the numerical controller (CNC) 50 for controlling the wire-cut electric discharge machine main body 30 will be described by using FIG. 2.

The wire-cut electric discharge machine main body 30 carries out machining of the workplace under control of the numerical controller (CNC) 50. The numerical controller 50 includes a processor (CPU) 51, memory 52 such as RAM and ROM, a display interface 53, a display 54, a keyboard interface 55, a keyboard 56, a servo interface 57, servo amplifiers 58, and an interface 60 for receiving signals from external devices. The respective components are connected to each other by a bus 61. The wire-cut electric discharge machine main body 30 includes a machining power supply.

The external devices 32 connected to the interface 60 include a device for detecting a contact/noncontact state between the wire electrode 1 and the workpiece 2 in the invention.

By detecting that the wire electrode 1 and the workpiece 2 has become equal to each other in potential when the wire electrode 1, to which faint voltage is applied by a voltage applying device (not shown) came in contact with the workpiece 2 with the external device 32 (the device for detecting the contact/noncontact state between the wire electrode 1 and the workpiece 2), it is possible to detect contact between the wire electrode 1 and the workpiece 2. The numerical controller 50 can receive the information of the detected contact through the interface 60 from the external device 32.

Servomotors 31 are driven by the servo amplifiers 58. Although FIG. 2 shows the single servomotor 31 and the single servo amplifier 58, a plurality of servomotors and a plurality of servo amplifiers are provided according to the number of drive axes. To each of the servomotors 31, a position detecting device (not shown) for detecting a position of the axis driven by the servomotor and feeding the detected axis position information back to the numerical controller 50 is mounted. Therefore, the numerical controller 50 can receive the position information of the wire electrode 1 when the wire electrode 1 and the workpiece 2 come in contact with each other from the position detecting device.

The wire-cut electric discharge machine main body 30 including the machining power supply is controlled by the numerical controller 50 through an interface 59. When running of a machining program starts, the wire-cut electric discharge machine main body 30 is ordered to turn the machining power supply on via the interface 59. To turn the machining power supply off, the wire-cut electric discharge machine main body 30 is ordered to do so via the interface 59. The numerical controller 50 receives a detection signal when the wire electrode 1 and the workpiece 2 come in contact with each other from the external device 32 via the interface 60.

Next, a machining operation and a measuring operation of the wire-cut electric discharge machine having the workpiece measuring function according to the invention will be described by using an example of a main program shown in FIG. 3 and an example of a subprogram shown in FIG. 4

First, O0001 (main program) shown in FIG. 3 will be described.

N01 M101 (measurement invalid)
N02 M98P0002 (machining)
N03 M102 (measurement valid)
N04 M98P0002 (measurement)
N05 M103 (result check & offset value update)
N06 IF [#1000EQ1] GOTOO1
N07 M30 (end of program)

Respective meanings of blocks N01 to N07 forming the program are described in parentheses. In the block N06, #100 is a macro variable representing a program restarting flag. If the program restarting flag is 1 (1 means ON), the program is ran again from the block N01. A switch between ON and OFF of the program restarting flag is made based on the result check performed by a code of M103 in the block. N05. As indicated in the block N04 (measurement), the subprogram (O0002) used for machining is called up and used for controlling movement, of the wire electrode 1 with respect to the workpiece 2 in the workpiece measurement.

Next, O0002 (subprogram) shown in FIG. 4 will be described,

N101 G92X0Y0
N102 G90G42
N103 Y10
N104 X10
N105 Y-10
N106 X-10
N107 Y10
N1088 X0
N109 G40Y0
N110 M99

In the above subprogram, 'G92' means a workpiece coordinate system setting command, 'G90' means an absolute command, 'G42' means an offset command, 'G40' means an offset canceling command, and 'M99' means an end of the subprogram, respectively.

Figure 3:
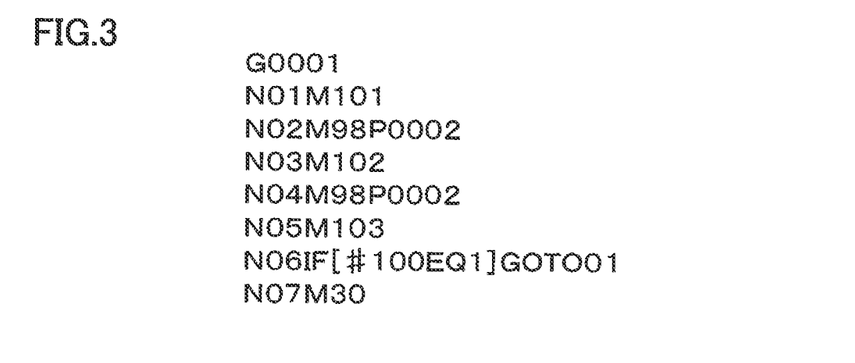
FIG. 3 is a drawing showing an example of a main program.
Figure 5:
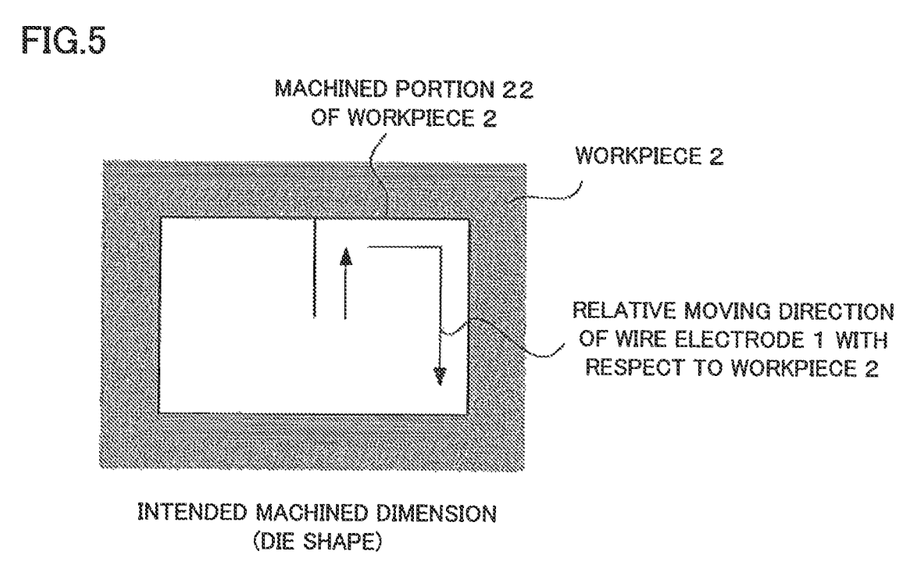
FIG. 5 is a drawing for explaining a shape of a female die machined by the program shown in FIG. 3.

FIG. 5 is a drawing for explaining a shape of a female die machined by the program shown in FIG. 3.

First, machining is carried out as usual according to the program O0001 shown in FIG. 3. As shown in FIG. 3, the M code ('M101') indicating that the measurement is invalid is performed in the block before calling up of the subprogram and starting of the machining of the workpiece.

After the machining of the workpiece 2 is finished, the M code ('M102') indicating that the measurement is valid is performed. The subprogram O0002 (FIG. 4) which was called up at the time of machining of the workpiece is called up again. In a case where the measurement is valid, the subprogram is carried out without electric discharge while searching for a measuring point. To set the measuring point, it is possible to choose one of two types, (1) running from a midpoint position of the block and (2) running at every designated distance from a block starting point. In each case of the types (1) and (2), the measuring operation is carried out in the block after the offset becomes valid.

At the start of the block, a block length is calculated based on starting point coordinates and end point coordinates of the block. If a moving position of the wire electrode 1 in the block reaches the measuring point, the program operation is stopped temporarily. A measuring direction of the workpiece is such a direction as to cancel a commanded offset. To put it concretely, a measuring direction is calculated based on the starting point and the end point of the block and an offset direction.

Figure 6:
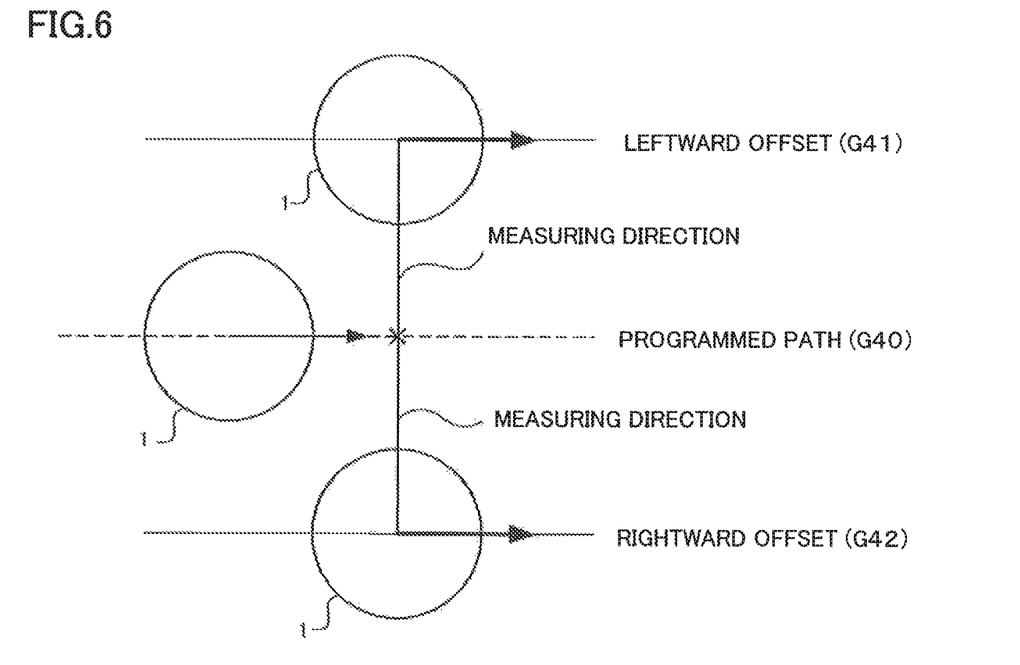
FIG. 6 is a drawing for explaining an offset command.

FIG. 6 is a drawing for explaining an offset command.

G40 is a command for canceling the offset and the wire electrode 1 moves along a programmed path in this case. G41 is a command of a leftward offset and is the command for the leftward offset with respect to a traveling direction of the wire electrode 1. G42 is a command of a rightward offset and is the command for the rightward offset with respect to the traveling direction of the wire electrode 1. To offset, an offset amount set in advance in a storage device in the numerical controller 50 is read out and the read-out offset amount can be used. However, in the workpiece measurement in the invention, an offset amount is calculated and an offset amount stored already is updated with the offset amount obtained by calculation and the updated offset amount is used.

Because the numerical controller 50 has the offset command of G41 or G42 as modal information, when the wire electrode 1 reaches the measuring point in the workpiece measurement, it is possible to specify whether to move the wire electrode 1 rightward or leftward with respect to the traveling direction on a measuring path (the same path as a machining path) of the wire electrode 1. In other words, if the offset command is G41 (leftward offset command), the measuring direction may be such a direction as to cancel the command (rightward with respect to a moving direction of the wire electrode 1). If the offset command is G42 (rightward offset command), the measuring direction may be such a direction as to cancel the command (leftward with respect to the moving direction of the wire electrode 1). Then, by calculating the direction selected by the above method which is the direction orthogonal to a vector in the moving direction of the wire electrode 1 on the measuring path, the direction can be obtained as a relative moving direction of the wire electrode 1 with respect to the workpiece 2.

After the relative moving direction of the wire electrode 1 with respect to the workpiece 2 is obtained, a measuring sequence is performed. In this measuring sequence, detecting operation of the end faces of the workpiece 2 is carried out by using the wire electrode 1 and a measuring device 21 (see FIG. 11). For example, in the block N105 in the subprogram in FIG. 4, a starting point is X10Y10 and an end point is X10Y-10. Therefore, the wire electrode 1 may be moved with respect to the workpiece 2 relatively toward a measuring point X10Y0 which is an intermediate position (an intermediate position of a line segment connecting the starting point X10Y10 and the end point X10Y-10) of the block.

Figure 7:
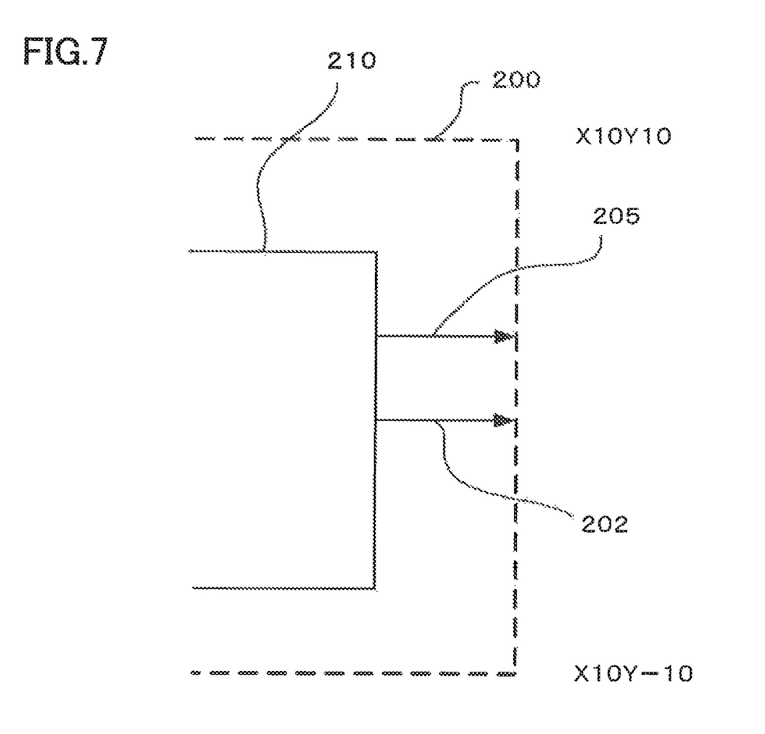
FIG. 7 is a drawing for explaining calculation of measuring direction.

FIG. 7 is a drawing for explaining calculation of the measuring direction.

A case in which measuring operation is carried out according to O0001 (the main program) and O0002 (the subprogram) will be described as an example. A reference numeral 200 denotes a machining path commanded in the block of the program. A reference numeral 210 denotes a moving path of the wire electrode 1 obtained by adding the offset amount to the path commanded in the program. A reference numeral 202 denotes a measuring direction in a case where a midpoint of the block is the measuring point. A reference numeral 205 denotes a measuring direction in a case where a position away from a starting point of the block by a designated distance is the measuring point.

Figure 8:
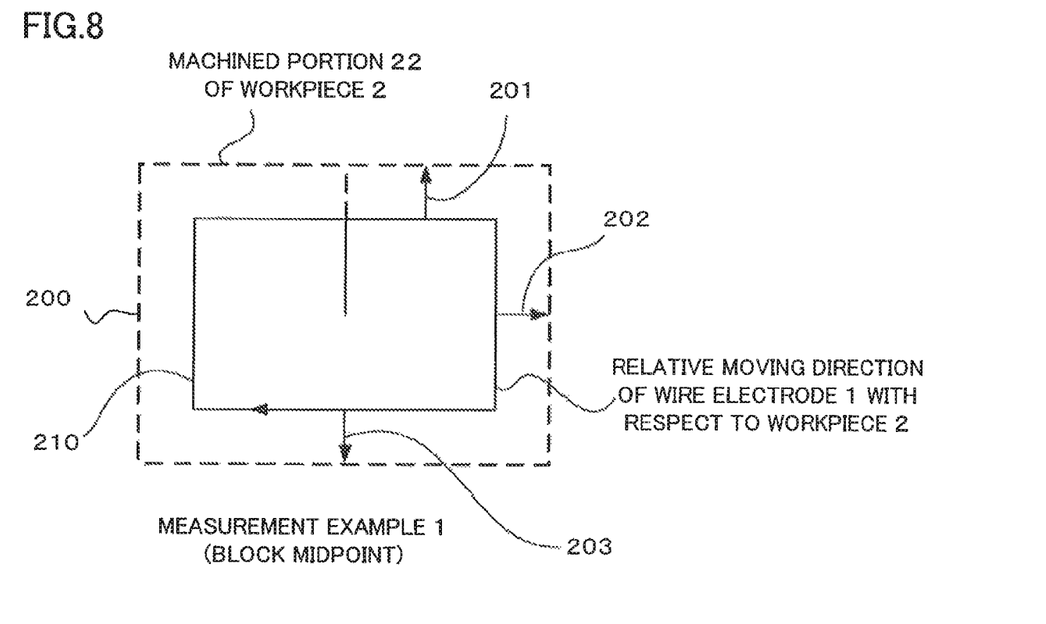
FIG. 8 is a drawing for explaining workpiece measurement by using the subprogram shown in FIG. 4 when a block midpoint position is a measuring point.

In the workpiece measuring operation, the wire electrode 1 is moved in an opposite direction to the offset command in the machining program. Because the offset command in the subprogram (O0002) of FIG. 4 used for the machining is G42 (the rightward offset command), the offset command when the subprogram is used for the measurement is G41 (the leftward offset command). FIG. 8 is a drawing for explaining workpiece measurement by using the subprogram O0002 shown in FIG. 4 and when the block midpoint position is the measuring point.

In FIG. 8, a reference numeral 200 denotes a machining path commanded in each block of the subprogram and a reference numeral 210 denotes a moving path of the wire electrode 1 obtained by adding the offset amount by the offset command to the machining path commanded in the block of the subprogram.

A reference numeral 201 denotes a moving direction of the wire electrode 1 with respect to the workpiece 2 when a block midpoint position in the block N104 is a measuring point, a reference numeral 202 denotes a moving direction of the wire electrode 1 with respect to the workpiece 2 when a block midpoint position in the block N105 is a measuring point, and a reference numeral 203 denotes a moving direction of the wire electrode 1 with respect to the workpiece 2 when a block midpoint position in the block N106 is a measuring point. The relative moving direction of the wire electrode 1 with respect to the workpiece 2 is an opposite direction to the offset direction by the offset command. In other words, while the wire electrode 1 is moved relatively in such a direction away from the workpiece 2 by the offset command in the machining, the wire electrode 1 is moved in such a direction as to come in contact with the workpiece 2 in the workpiece measurement.

Figure 4:
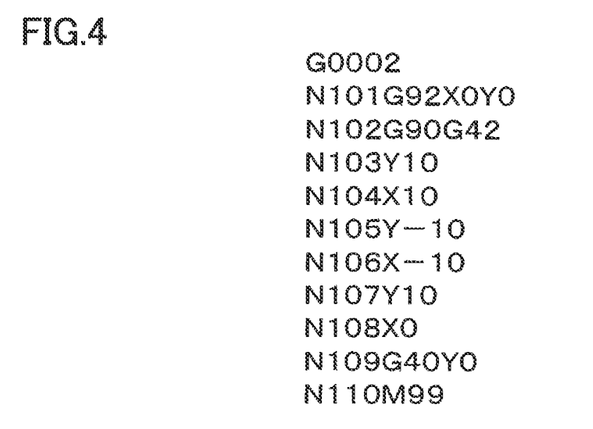
FIG. 4 is a drawing showing an example of a subprogram.
Figure 9:
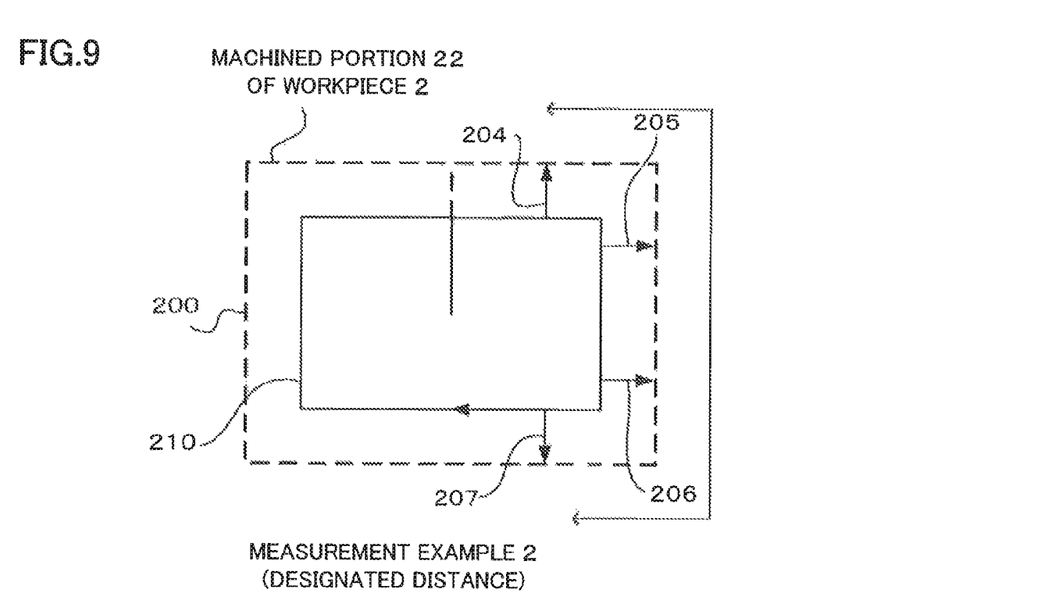
FIG. 9 is a drawing for explaining workpiece measurement by using the subprogram shown in FIG. 4 when a position away from a block, starting point by a designated distance is a measuring point.

FIG. 9 is a thawing for explaining workpiece measurement by using the subprogram O0002 shown in FIG. 4 when a position away from a block starting point by a designated distance is a measuring point.

In FIG. 9, a reference numeral 200 denotes a machining path commanded in the block of the program. A reference numeral 210 denotes a moving path of the wire electrode 1 obtained by adding the offset amount by the offset command to the machining path commanded in the block of the program. Reference numerals 204, 205, 206, and 207 denote relative moving directions of the wire electrode 1 with respect to the workpiece 2 when positions away from starting points of the respective blocks (blocks N104, N105, and N106) in the subprogram by designated distances are measuring points.

To detect an end face position of the workpiece 2 based on contact of the wire electrode 1 with the workpiece 2, it is necessary to bring the wire electrode 1 on the offset path (that is, the wire electrode 1 that has been moved in the direction away from the workpiece 2 for the machining by the offset command) close to the workpiece 2. In other words, in the measurement, it is necessary to move the wire electrode 1 in the opposite direction to the offset direction for the machining.

Figure 10A:
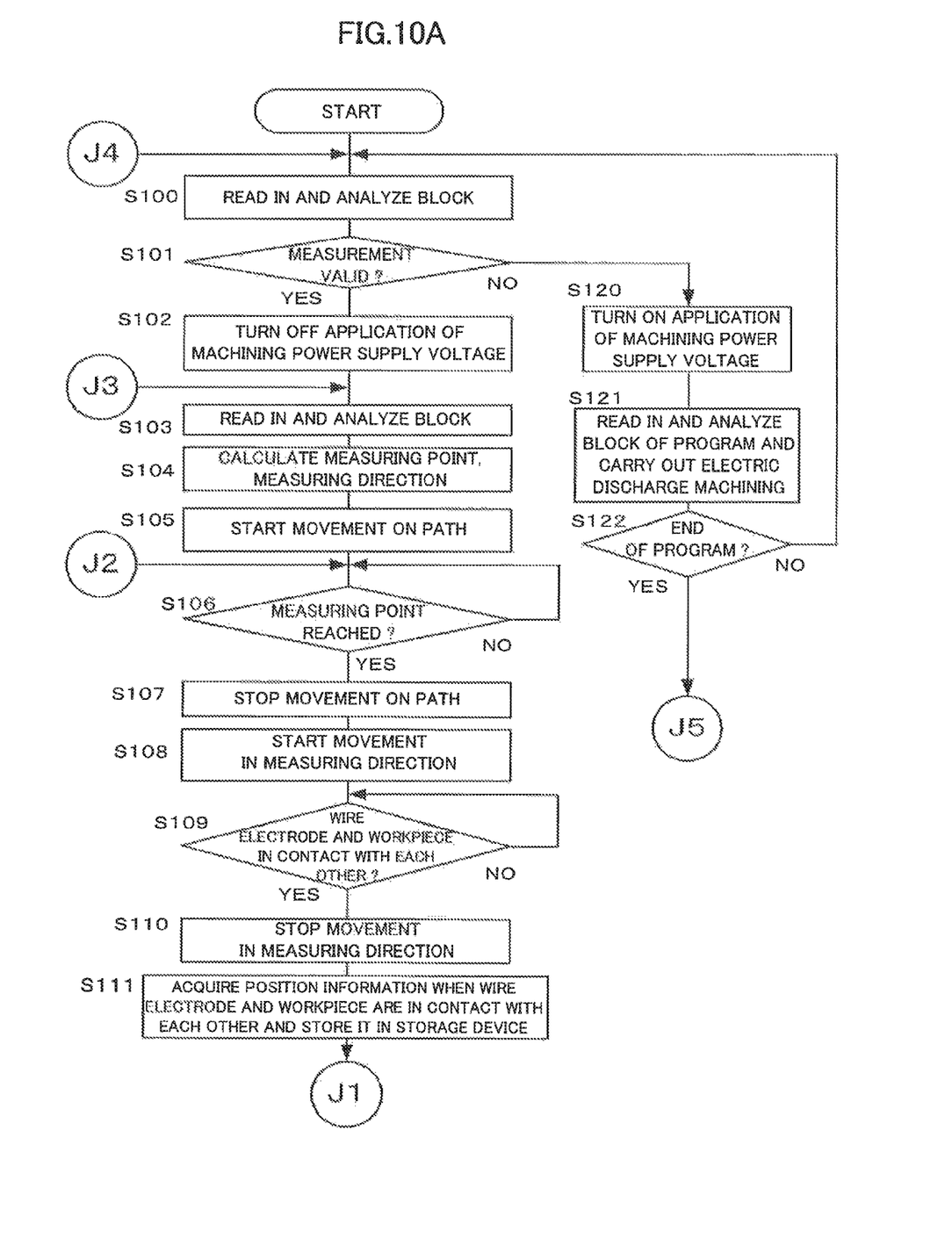
FIG. 10A and FIG. 10B are drawings for explaining an algorithm of processing for implementing a workpiece measuring function possessed by the wire-cut electric discharge machine according to the invention.
Figure 10B:
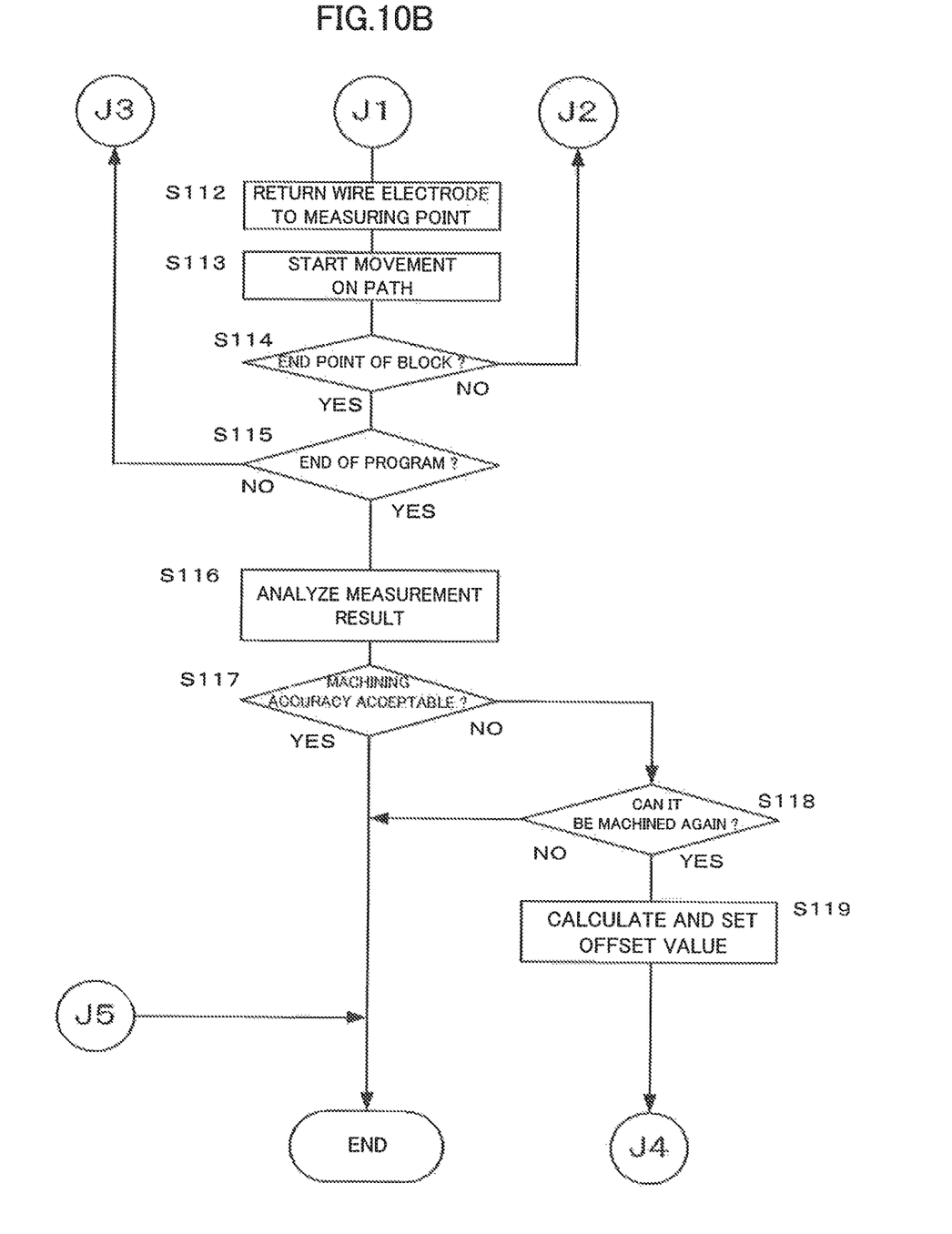

FIG. 10A and FIG. 10B are drawings for explaining an algorithm of processing for implementing the workpiece measuring function possessed by the wire-cut electric discharge machine according to the invention. The algorithm will be described below along the respective steps.

[Step S100] A block of the machining program is read in and analyzed.

[Step S101] Whether or not the measurement is valid is determined. If it is valid, the processing proceeds to step S102. If it is not valid, the processing proceeds to step S120.

[Step S102] Application of machining power supply voltage is turned off.

[Step S103] A block of the machining program is read in and analyzed.

[Step S104] A measuring point and a measuring direction are obtained.

[Step S105] The wire electrode is moved along a path in the block analyzed in step 2103.

[Step S106] Whether or not the wire electrode moving on the path has reached the measuring point obtained in step S104. If it has not reached the measuring point, the movement on the path is continued. If it has reached the measuring point, the processing proceeds to step S107.

[Step S107] The movement of the wire electrode on the path is stopped.

[Step S108] The wire electrode is moved in the measuring direction obtained in step S104.

[Step S109] Whether or not the wire electrode moving in the measuring direction as come in contact with the workpiece is determined. If it has not come in contact, the movement of the wire electrode in the measuring direction is continued. If it has come in contact, the processing proceeds to step S110.

[Step S110] The movement of the wire electrode in the measuring direction is stopped.

[Step S111] Position information of the wire electrode when the wire electrode comes in contact with the workpiece acquired and stored in the storage device.

[Step S112] The wire electrode in contact with the workpiece is returned to the measuring point.

[Step S113] The movement of the wire electrode on the path is restarted.

[Step S114] Whether or not the wire electrode moving on the path has reached a block end point is determined. If it has not reached, the processing returns to S106. If it has reached, the processing proceeds to S115.

[Step S115] Whether or not an end of the program has been reached is determined. If it is the end of the program, the processing proceeds to step S116. If it is not the end of the program, the processing proceeds to step S103.

[Step S116] A measurement result is analyzed,

[Step S117] Whether or not machining accuracy is acceptable as a result of the analysis in step S116 is determined. If it is acceptable, the processing ends. If it not acceptable, the processing proceeds to step S115.

[Step S118] Whether or not the workpiece can be machined again is determined. If it can be machined again, the processing proceeds to step S119. If it can not be machined again, the processing is ended.

[Step S119] To update the offset value, an offset value is calculated and a calculation result is set as a new offset value.

[Step S120] The machining power supply voltage is turned on.

[Step S121] A block of the program is read in and analyzed and electric discharge machining is carried out.

[Step S122] Whether or not the end of the program has been reached is determined. If it is not the end of the program, the processing returns to step S100. If it is the end of the program, the processing is ended.

Figure 11:
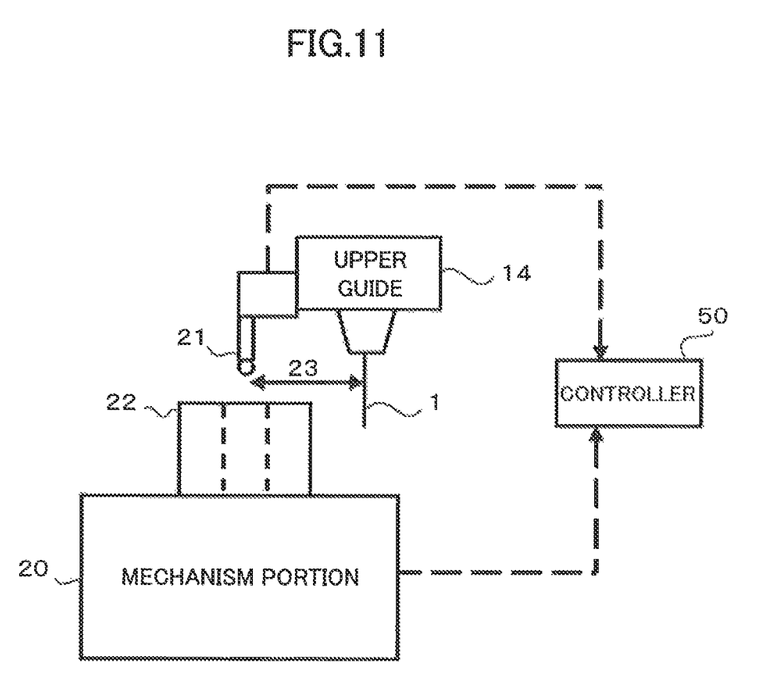
FIG. 11 is a drawing for explaining an embodiment of the invention in which a measuring device is mounted to an upper wire guide.

Next, an embodiment of the invention in which a measuring device is mounted to the upper wire guide will be described by using FIG. 11.

In the embodiment described by using FIGS. 2 to 10B, the wire electrode 1 is used as a probe for detecting the end faces of the workpiece 2. In the embodiment shown in FIG. 11, the measuring device 21 such as a touch probe is used instead of the wire electrode 1 as a probe for detecting the end faces. The measuring device 21 (touch probe) is fixed to the upper wire guide 14 of the wire-cut electric discharge machine.

A relative positional relationship of the measuring device 21 to the wire electrode 1 is fixed. Therefore, to move the measuring device 21 to a detecting position of the end face of the workpiece 2, an offset obtained by adding the relative positional relationship of the measuring device 21 with respect to the wire electrode 1 to the path on which the wire electrode 1 as the end face detecting probe is moved, as described above with reference to FIGS. 1 to 10B, is given to form a moving path of the measuring device 21.

The invention claimed is:

1. A wire-cut electric discharge machine, comprising:
a wire-cut electric discharge machine main unit including a wire electrode; and
a controller configured to control the wire-cut electric discharge machine main unit, wherein
the controller includes:
an analysis and calculation unit configured to analyze a block of a machining program and to calculate a measuring point and a measuring direction based on a result of the analysis;
a control unit configured to control application of a machining power supply voltage to the wire electrode to machine a workpiece according to the machining program;
a storage unit configured to store the measuring point and the measuring direction calculated by the analysis and calculation unit;
a first movement unit configured to move the wire electrode relative to the workpiece in a state in which the application of the machining power supply voltage to the wire electrode is turned off according to the block of the machining program analyzed by the analysis and calculation unit;
a determination unit configured to determine whether or not the wire electrode moved by the first movement unit has reached the measuring point;
a second movement unit configured to move the wire electrode relative to the workpiece in the measuring direction, in response to a determination made by the determination unit that the wire electrode has reached the measuring point; and
an end face detection unit configured to detect a position of an end face of the workpiece as a result of the wire electrode moved by the second movement unit being brought into contact with the workpiece, wherein
the measuring point is a midpoint between a starting point and an end point defined by the block of the machining program, an equally dividing point between the starting point and the end point, or a position a predetermined distance away from the starting point.

2. The wire-cut electric discharge machine according to claim 1, wherein the measuring direction is obtained from a relative moving direction of the wire electrode with respect to the workpiece and an offset command described in the block in the machining program.

3. The wire-cut electric discharge machine according to claim 1, further comprising a measuring probe configured to be placed into contact with the workpiece to detect the contact with the workpiece such that the measuring probe can be used, in place of the wire electrode, to contact the workpiece, and wherein the end face detection unit is configured to detect a position of the end face of the workpiece at the time when the measuring probe comes in contact with the workpiece.

4. A wire-cut electric discharge machine, comprising:
a wire-cut electric discharge machine main unit including a wire electrode; and
a controller configured to control the wire-cut electric discharge machine main unit, wherein
the controller includes:
an analysis and calculation unit configured to analyze a block of a machining program and to calculate a measuring point and a measuring direction based on a result of the analysis;
a control unit configured to control application of a machining power supply voltage to the wire electrode to machine a workpiece according to the machining program;
a storage unit configured to store the measuring point and the measuring direction calculated by the analysis and calculation unit;
a first movement unit configured to move the wire electrode relative to the workpiece in a state in which the application of the machining power supply voltage to the wire electrode is turned off according to the block of the machining program analyzed by the analysis and calculation unit;
a determination unit configured to determine whether or not the wire electrode moved by the first movement unit has reached the measuring point;
a second movement unit configured to move the wire electrode relative to the workpiece in the measuring direction, in response to a determination made by the determination unit that the wire electrode has reached the measuring point; and
an end face detection unit configured to detect a position of an end face of the workpiece as a result of the wire electrode moved by the second movement unit being brought into contact with the workpiece, wherein
the measuring direction is obtained from a relative moving direction of the wire electrode with respect to the workpiece and an offset command described in the block of the machining program.

5. The wire-cut electric discharge machine according to claim 4, wherein the measuring direction is obtained from a relative moving direction of the wire electrode with respect to the workpiece and an offset command described in the block in the machining program.

6. The wire-cut electric discharge machine according to claim 4, further comprising a measuring probe configured to be placed into contact with the workpiece to detect the contact with the workpiece such that the measuring probe can be used, in place of the wire electrode, to contact the workpiece, and wherein the end face detection unit is configured to detect a position of the end face of the workpiece at the time when the measuring probe comes in contact with the workpiece.

7. A controller for controlling a wire-cut electric discharge machine main unit including a wire electrode, the controller comprising:
an analysis and calculation unit configured to analyze a block of a machining program and to calculate a measuring point and a measuring direction based on a result of the analysis;
a control unit configured to control application of a machining power supply voltage to the wire electrode to machine a workpiece according to the machining program;
a storage unit configured to store the measuring point and the measuring direction calculated by the analysis and calculation unit;
a first movement unit configured to move the wire electrode relative to the workpiece in a state in which the application of the machining power supply voltage to the wire electrode is turned off according to the block of the machining program analyzed by the analysis and calculation unit;
a determination unit configured to determine whether or not the wire electrode moved by the first movement unit has reached the measuring point;
a second movement unit configured to move the wire electrode relative to the workpiece in the measuring direction, in response to a determination made by the determination unit that the wire electrode has reached the measuring point; and
an end face detection unit configured to detect a position of an end face of the workpiece as a result of the wire electrode moved by the second movement unit being brought into contact with the workpiece, wherein
the measuring point is a midpoint between a starting point and an end point defined by the block of the machining program, an equally dividing point between the starting point and the end point, or a position a predetermined distance away from the starting point.

8. The controller according to claim 7, wherein the measuring direction is obtained from a relative moving direction of the wire electrode with respect to the workpiece and an offset command described in the block in the machining program.

9. The controller according to claim 7, further comprising a measuring probe configured to be placed into contact with the workpiece to detect the contact with the workpiece such that the measuring probe can be used, in place of the wire electrode, to contact the workpiece, and wherein the end face detection unit is configured to detect a position of the end face of the workpiece at the time when the measuring probe comes in contact with the workpiece.

10. A controller for controlling a wire-cut electric discharge machine main unit including a wire electrode, the controller comprising:
an analysis and calculation unit configured to analyze a block of a machining program and to calculate a measuring point and a measuring direction based on a result of the analysis;
a control unit configured to control application of a machining power supply voltage to the wire electrode to machine a workpiece according to the machining program;
a storage unit configured to store the measuring point and the measuring direction calculated by the analysis and calculation unit;

a first movement unit configured to move the wire electrode relative to the workpiece in a state in which the application of the machining power supply voltage to the wire electrode is turned off according to the block of the machining program analyzed by the analysis and calculation unit;

a determination unit configured to determine whether or not the wire electrode moved by the first movement unit has reached the measuring point;

a second movement unit configured to move the wire electrode relative to the workpiece in the measuring direction, in response to a determination made by the determination unit that the wire electrode has reached the measuring point; and an end face detection unit configured to detect a position of an end face of the workpiece as a result of the wire electrode moved by the second movement unit being brought into contact with the workpiece, wherein the measuring direction is obtained from a relative moving direction of the wire electrode with respect to the workpiece and an offset command described in the block of the machining program.

11. The controller according to claim 10, wherein the measuring direction is obtained from a relative moving direction of the wire electrode with respect to the workpiece and an offset command described in the block in the machining program.

12. The controller according to claim 10, further comprising a measuring probe configured to be placed into contact with the workpiece to detect the contact with the workpiece such that the measuring probe can be used, in place of the wire electrode, to contact the workpiece, and wherein the end face detection unit is configured to detect a position of the end face of the workpiece at the time when the measuring probe comes in contact with the workpiece.

* * * * *